United States Patent [19]

Girling et al.

[11] Patent Number: 4,529,703
[45] Date of Patent: Jul. 16, 1985

[54] MONITORING FLOW-RATE CHANGES OF A PLURALITY OF FLUID STREAMS

[75] Inventors: Peter M. Girling, Allentown, Pa.; Edward L. Lisi, Morristown, N.J.

[73] Assignee: Exxon Research and Engineering Co., Florham Park, N.J.

[21] Appl. No.: 487,177

[22] Filed: Apr. 21, 1983

[51] Int. Cl.³ .......................................... G01N 33/22
[52] U.S. Cl. ........................................ 436/3; 436/55; 422/110; 137/2
[58] Field of Search .......... 422/62, 110, 111; 436/55, 143, 161, 2, 3; 73/40; 137/2, 4, 5, 93

[56] References Cited

U.S. PATENT DOCUMENTS

| | | | |
|---|---|---|---|
| 3,111,835 | 11/1963 | Jenkins | 436/161 |
| 3,672,840 | 6/1972 | Fenske et al. | 422/62 |
| 4,241,230 | 12/1980 | Drinkard | 585/259 |
| 4,251,224 | 2/1981 | Cowley et al. | 422/62 |
| 4,256,720 | 3/1981 | Kallenberger | 423/449 |

Primary Examiner—Barry S. Richman
Assistant Examiner—Joseph P. Carrier
Attorney, Agent, or Firm—Donald F. Wohlers

[57] ABSTRACT

Changes in the flow-rates of each one of a plurality of fluid streams which pass from respective conduits (13) to a common conduit (12) are monitored by taking a representative sample of fluid from a sampling point (16) of the common conduit, determining the change in composition of at least key components of the sample relative to a preceding sample obtained in the same manner, and computing from the change in composition the composition of the fluid stream whose flow-rate has changed, so that the fluid stream can be identified by reference to a library or database of fluid stream compositions. When the fluid streams are gases (e.g. gases to be flared at an oil refinery or chemical process plant), each sample may be analyzed by a gas chromatograph (18) at predetermined intervals and the fluid stream whose flow-rate has changed may be identified automatically by comparison with a database or library (22) of fluid streams. The thus identified fluid stream may be recorded and/displayed (19). The monitoring may be completely automatic. The method and apparatus of the invention avoid the necessity to provide flow-monitoring equipment in each conduit (13).

6 Claims, 1 Drawing Figure

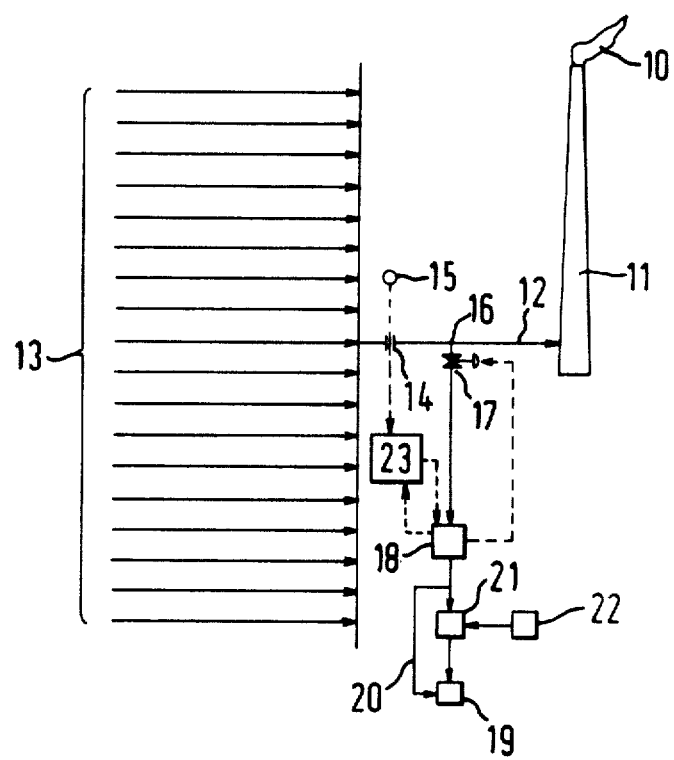

MONITORING FLOW-RATE CHANGES OF A PLURALITY OF FLUID STREAMS

The present invention relates to monitoring flow-rate changes of a plurality of fluid streams, in order to identify their source.

It is relatively common to mix a plurality of streams of fluid (gas or liquid) in a common container or a duct. Each fluid stream enters the container or duct from a respective conduit, and it is often desirable and sometimes essential to be able to determine whether the mixed fluid is composed of predetermined proportions of the fluids available from each conduit. When the number of conduits is small, there is not usually any problem in determining that the rate of supply of fluid from one conduit has changed (i.e. increased, decreased, stopped, started), but when the number of conduits is large, there are considerable difficulties in identifying which conduit is providing flow at a changed flow-rate. Since a changed flow rate may involve a fluid which is valuable or dangerous (or both), there have long been considerable incentives to devise a method of determining such a changed flow rate.

The present invention provides a method of determining which fluid stream of a plurality of fluid streams flowing through respective conduits flows at a changed rate, the method comprising the steps of:

(a) recovering a composite sample of fluid from a sampling point (e.g. a single sampling point) which is common to all of the conduits;

(b) comparing a feature of a characteristic of the composite sample with the feature of the characteristic of another composite sample obtained from the sampling point at a different time; and (c) determining from the change in the said feature of the characteristic of the two samples which stream of fluid is flowing at a changed rate.

The features of the characteristic may be the concentration (including presence or absence) or proportion of at least one substance in each composite sample. Such a feature may be determined by any convenient technique, e.g. thermal or electrical conductivity, NMR, colour, dielectric properties, emission spectra, X-ray spectra, heat of combustion, inter alia. When the fluid streams are all gaseous, the existence or concentration or proportion of at least one substance in each sample may be determined by gas chromatography techniques. Whichever technique (or combination of techniques) is employed, step (c) is preferably performed automatically by comparison with a library or database of the features of the characteristics of fluid streams.

Preferably steps (a), (b) and (c) of the method of the invention are repeated, and the interval between repeats is preferably as short as possible having regard to the type of equipment employed to perform the method. Appropriate and meaningful data may be obtained from non-consecutive repeats, particularly when the time interval between repeats is relatively short in relation to the time periods over which the said feature of the characteristic changes or takes to change to a final or lined-out value from a changing or transient value.

In one embodiment, the fluid streams flow into a common conduit from their respective conduits, and the sampling point is at a location suitable for recovering substantially representative samples from the common conduit.

In a further embodiment, the method of the invention further comprises the steps of:

(d) monitoring the flow-rate of fluid in the common conduit substantially at times and positions at which the monitored fluid has the compositions of which the samples are substantially representative; (e) determining any change in fluid flow rate in the common conduit; and (f) calculating from the result of step (e) and the corresponding result of step (c) the concentration of at least one component of a stream of fluid flowing at a changed rate. Step (f) is preferably performed automatically by a computer.

Preferably, synchronizing means are employed to control the timing of steps (a), (b) and (d) so that the said composite samples and the corresponding monitored flow-rates are obtained at corresponding respective times and intervals.

The invention also comprises apparatus for performing the aforedescribed method.

The invention is now further described with reference to a non-limiting embodiment thereof given by way of example only.

The operations performed at the processing units of a petroleum refinery or petrochemical installation sometimes produce gases in excess of the requirements for the operations. Because these excess gases are available intermittently, they cannot usually be used in the refinery or plant, and they are therefore disposed of. In most cases, the excess gases are flammable, and the disposal is by burning the gases, e.g. at a flare. In a typical oil refinery, there may be several hundred pipes each conducting excess gas from a process unit to the flare. The venting of gas from the process unit to the flare is controlled by a let-down valve which is set to open at a selected pressure, and there is also provided a safety relief valve in parallel with the let-down valve, to relieve any pressure build-up in a process unit before the pressure attains dangerous levels. The let-down valve and the safety valve are both prone to leakage, and such leakage results in the unplanned loss of gases resulting in higher operating costs for the process unit. Although it is possible to install a flowmeter at or near each valve to determine the flow rate of vented gas from each unit into each pipe, the large numbers of pipes and valves makes this approach exceedingly expensive. The method and apparatus of the invention provide a relatively low-cost alternative which can be used reliably in all normal plant operating modes.

In the application of the invention, composite gas samples are periodically withdrawn from the common conduit which receives gases piped from process units and other sources via respective pipes and supplies the gases to the flare. Each composite gas sample is compared with a preceding composite gas sample to determine whether or not the composition of the gas in the common conduit has changed. Any change in the composition of the gas in the common conduit is due to the presence of different amounts of gas from one or more process units as a result of the operating conditions in the process units and/or variations in the leakage of gas from the process units. By comparing the compositions of successive (but not necessarily consecutive) composite gas samples, it is possible to determine the composition of the gas which has caused the change in composition. The composition of the gas which has caused the change is correlated with the compositions of known gases produced in the process units (e.g. from a library or database of such compositions) and it is thereby possible to identify the process unit which is responsible for the change in the gas composition in the common conduit.

Suitably, each composite gas sample is analyzed by a gas chromatography analyzer, and the latter may be linked to microprocessor/comparator equipment which compares each analysis with a preceding analysis. The comparison may be effected in such a manner that by suitable computing, the composition of the gas causing the change of composition is determined, and by drawing on a library or database of gas compositions, the source of the change of composition may be identified. The method of the invention may be partially or fully automated. In the latter case, the source of the change of gas composition may be recorded and/or displayed.

In one embodiment of the invention, provision is made whereby the concentration or proportion of at least one component of a fluid stream which flows at a changed rate is determined. In this embodiment, suitable equipment is employed to monitor the flow rate of fluid in the common conduit from which the representative samples are taken, and changes in the flow-rate are correlated with changes in the composition (and/or any other feature of a characteristic) of the monitored fluid, as substantially representatively sampled.

If the initial flow rate $Q_1$, of fluid in the common conduit changes to a different flow rate $Q_2$ due to a change in the flow-rate of one stream of the plurality of fluid streams contributing to the total flow in the common conduit, the concentration (c) of a respective component in the said one stream can be calculated from the equation:

$$c = G_2 - \frac{Q_1(G_1 - G_2)}{Q_2 - Q_1} \quad \text{Equation (1)}$$

where $G_1$ and $G_2$ are respectively the concentrations of the respective component in the total flow in the common conduit at the time of the flow rates $Q_1$ and $Q_2$.

The method of the invention is now further illustrated with reference to a non-limitative example in which pipes A, B, C, D and E are available to conduct cases from respective sources to the flare, and wherein the gases can comprise components 1 to 8.

EXAMPLE

In one test, the following data are obtained:

TABLE 1

| Component No. | Pipe A | B | C | D | E | Total Flow Units | Flare Gas Analysis % |
|---|---|---|---|---|---|---|---|
| | | | Units of Flow | | | | |
| 1 | — | — | — | 5 | — | 5 | 3.33 |
| 2 | 10 | 40 | — | — | — | 50 | 33.33 |
| 3 | 20 | 10 | — | — | — | 30 | 20 |
| 4 | 10 | — | — | 5 | — | 15 | 10 |
| 5 | — | — | — | 20 | — | 20 | 13.33 |
| 6 | — | — | — | 10 | — | 10 | 6.66 |
| 7 | — | — | — | — | 10 | 10 | 6.66 |
| 8 | — | — | — | 10 | — | 10 | 6.66 |
| | 40 | 50 | — | 50 | 10 | 150 | 100 |

The percentage analysis of the flare gas, which is the gas mixture resulting from combining the separate gas streams from the pipes A to E, is determined by a gas chromatograph.

In a subsequent test, the following data are obtained

TABLE 2

| Component No. | Pipe A | B | C | D | E | Total Flow Units | Flare Gas Analysis % |
|---|---|---|---|---|---|---|---|
| | | | Units of Flow | | | | |
| 1 | — | — | 10 | 5 | — | 15 | 7.5 |
| 2 | 10 | 40 | — | — | — | 50 | 25 |
| 3 | 20 | 10 | — | — | — | 30 | 15 |
| 4 | 10 | — | — | 5 | — | 15 | 7.5 |
| 5 | — | — | — | 20 | — | 20 | 10 |
| 6 | — | — | 20 | 10 | — | 30 | 15 |
| 7 | — | — | 20 | — | 10 | 30 | 15 |
| 8 | — | — | — | 10 | — | 10 | 5 |
| | 40 | 50 | 50 | 50 | 10 | 200 | 100 |

From the change in the composition of the flare gas, the composition of the gas stream which has caused the change can be calculated, as follows:

| Component | Initial % of Flare Gas | Final % | Change in % |
|---|---|---|---|
| 1 | 3.33 | 7.50 | +4.17 |
| 2 | 33.33 | 25.00 | −8.33 |
| 3 | 20.00 | 15.00 | −5.00 |
| 4 | 10.00 | 7.50 | −2.50 |
| 5 | 13.33 | 10.00 | −3.33 |
| 6 | 6.66 | 15.00 | +8.34 |
| 7 | 6.66 | 15.00 | +8.34 |
| 8 | 6.66 | 5.00 | −1.66 |
| | 100.00 | 100.00 | 0.00 |

It will be seen that there has been a relative increase in the proportions of components 1, 6 and 7 (totalling 20.85%) and a corresponding relative decrease in the proportions of all the other components (totalling 20.83%). The small difference between the percentage increase and decrease arises from rounding off the percentages to two significant decimal places.

The composition of a gas stream consisting of components 1, 6 and 7 which would produce the changed percentage compositions determined above is easily calculated as follows:

Component 1: $\frac{4.17}{20.85} \times 100\% = 20\%$

Component 6: $\frac{8.33}{20.85} \times 100\% = 40\%$

Component 7: $\frac{8.33}{20.85} \times 100\% = 40\%$

During normal plant operation, one would expect any change in the flare gas composition between each analysis thereof to be attributable to gas being released from a single process unit. Thus, the change in flare gas composition can be expected to be due to the addition of gas released from one process unit, and the additional released gas has a composition consisting of: 20% component 1, 40% component 6 and 40% component 7. By reference to a library or database of the compositions of gases produced in process units, the process unit from which the additional gas has been released can easily be identified and the operation of the process unit can be checked to ascertain the reason for the release and loss of gas, and, if possible, to change the operating conditions to reduce or eliminate the loss. It is evident from the data given in the first two tables that the additional gas in the flare gas is from pipe C, but it will be appreciated that it is not necessary to determine the flow or composition of gas in any one of the pipes communicating with the common conduit of the flare.

A compositional analysis of the total gas flow before and after a change in flow rate can be calculated using equation (1), given infra. Such a compositional analysis permits identification of the gas stream which has a changed flow-rate, and/or permits of verification of the identity of the gas stream as identified by the calculations given previously.

Using the data given in Tables 1 and 2 in equation (1), it is found for component 1 that:

$$c = 7.5 - \frac{150(3.33 - 7.5)}{200 - 150}$$

giving: c=20%
which agrees with the result found previously.

Similar calculations for components 6 and 7 give the same results as obtained previously. It will be appreciated that this latter method of calculation may be sufficient to identify a gas stream and/or to verify the identification resulting from the other method previously described.

It will be apparent to those skilled in the art that other mathematical manipulations of the differential compositional data can be envisaged to define the leak stream composition as a prelude to correlation with a library of known compositions.

The data in the example deal with a change arising from the addition of gas to the flare gas stream, but the method of the invention can equally well be applied to a change arising from the discontinuation or subtraction of gas previously forming part of the flare gas stream. It is worth noting that a stepwise change in the amount of gas released from a process unit will usually change the percentage amounts of only a minor proportion of the total number of components (or key components) of the flare gas. Thus, in the data of the example, the addition of gas from pipe C caused an increase in three components and a decrease in five components. If the total flow rate of flare gas is noted (using a single flowmeter), it is clear than the change is more likely to be due to the addition of a single three component stream than the discontinuation of a five component stream.

It must be borne in mind that the example refers only to 5 pipes which can supply the flare. In practice, there would be many more, typically 300 to 500 in a refinery. Moreover, there may be many more than 8 components of the flare gas. However, the skilled technologist will appreciate that it is necessary to monitor only those gas components which will be significant in identifying the process unit from which gas can be released to the flare.

The invention is useful in monitoring the normal operation of process units. When there is a major perturbation in the operation of a plant causing abnormal operation of many process units, the normal monitoring system of the plant will be employed to identify and rectify the cause of the perturbation.

The invention is applicable to streams other than gas streams, and can be applied to liquid streams and solid streams (e.g. mixtures of particulate solids), and any combination of at least two of gases, liquids and solids streams.

In the drawing, waste and excess gases released from process units (not shown) are burned in a flame 10 at the top of a flare stack 11. The waste gases are combined in a common conduit 12 for supply to the stack 11, and the conduit 12 receives gases from the process units via a plurality of respective pipes indicated generally by reference 13. The common conduit 12 may comprise a flowmeter 14 and a flow indicator 15 may display and/or record the flows measured by the flowmeter 14. Composite samples of gas are taken from the conduit 12 from a sampling point 16 via a valve 17 which is periodically (e.g. every 5 to 10 minutes) opened by a signal from a timing device (not shown) associated with gas analysis equipment 18. The gas analysis equipment 18 is suitably a gas chromatograph, and signals representative of the differential analysis of at least selected key components of successive (but not necessarily consecutive) gas samples are relayed either directly to an indicating and/or recording device 16 via line 20 and/or first to a comparator 21 which compares the signals with signals available from a database contained in a suitable memory device 22. The results of the operation of the comparator 21 are relayed to the recording and/or indicating device 19 (or to a separate, equivalent device) which indicates and/or records which process unit has caused and change in the composition of gas sampled at a sampling point 16.

When the method of the invention is to be employed using equation (1) to identify, and/or verify the identity of, the stream whose flow-rate changes, the flow-rate in the common conduit 12, as detected by flowmeter 14, is relayed to a computer 23 which also receives gas composition data from the gas analysis equipment 18. The computer 23 is programmed to calculate the concentration of each component, or selected components, using equation (1).

In the equipment as shown in the drawing, the flowmeter 14 is somewhat upstream of the sampling point 16. In order to ensure that the flow-rate data from flowmeter 14 and compositional data from equipment 18 correspond to the same sample, the equipment 18 is operated with an appropriate delay relative to the computer 23. The delay is governed by a synchronizing signal relayed to the equipment 18 form suitable means (not shown) associated either with the flowmeter 14 or the computer 23.

We claim:

1. A method of monitoring a petroleum refinery flare stack discharge and identifying which gaseous stream or streams of a plurality of individual unmetered gaseous streams flowing through respective individual conduits into a common flare stack conduit is the probable source of change in flow rate in said common conduit the method comprising the steps of:
    (a) feeding a plurality of distinct and separate unmetered streams of varying composition into a common flare stack conduit, each said stream having a predetermined substantially constant compositional make-up;
    (b) recovering a composite sample of a fluid from a sampling point in said common flare stack conduit;
    (c) analyzing the composition of said composite sample;
    (d) comparing the compositional analysis of the composite sample with the compositional analysis of another composite sample previously obtained from the sampling point; and
    (e) identifying from a change in the said compositional analysis of the two samples which individual stream or streams of said plurality of individual separate unmetered streams is the probable source of a change in flow rate to thereby eliminate the need to individually monitor the flow rate of each individual stream into said common flare stack conduit.

2. A method as in claim 1 in which step (e) is performed automatically by comparison with a database of compositional values of said individual fluid streams.

3. A method as in claim 1 in which steps (b), (c), (d) and (e) are repeated.

4. A method as in claim 1 in which the sampling point is at a location suitable for recovering substantially representative samples from the common flare stack conduit.

5. A method as in claim 1 in which the analysis of each composite sample includes determining the concentration or proportion of at least one substance in each composite sample.

6. A method as in claim 5 in which the said analysis is determined by gas chromatography.

* * * * *